United States Patent
Kimura (10) Patent No.: US 10,954,901 B2
(45) Date of Patent: Mar. 23, 2021

(54) INTAKE SYSTEM COMPONENT FOR INTERNAL COMBUSTION ENGINE

(71) Applicant: TOYOTA BOSHOKU KABUSHIKI KAISHA, Aichi-ken (JP)

(72) Inventor: Ryusuke Kimura, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/117,661

(22) Filed: Aug. 30, 2018

(65) Prior Publication Data
US 2019/0072060 A1    Mar. 7, 2019

(30) Foreign Application Priority Data

Sep. 7, 2017    (JP) .............................. JP2017-172085

(51) Int. Cl.
| | |
|---|---|
| F02M 35/10 | (2006.01) |
| B29C 65/78 | (2006.01) |
| B29C 65/00 | (2006.01) |

(52) U.S. Cl.
CPC ... F02M 35/10111 (2013.01); B29C 65/7814 (2013.01); B29C 66/712 (2013.01); F02M 35/10347 (2013.01); B29C 66/1312 (2013.01); F02M 35/10354 (2013.01)

(58) Field of Classification Search
CPC ............................. F02M 35/1272; B32B 5/022
USPC .................. 123/184.21, 184.24; 181/224
See application file for complete search history.

(56) References Cited

U.S. PATENT DOCUMENTS

| | | | | | |
|---|---|---|---|---|---|
| 5,462,793 | A | * | 10/1995 | Isoda | D04H 1/54 442/329 |
| 5,806,480 | A | * | 9/1998 | Maeda | F02M 35/10019 123/184.57 |
| 5,981,046 | A | * | 11/1999 | Masui | B29C 44/025 428/213 |
| 6,553,953 | B1 | * | 4/2003 | Fujihara | F02M 35/10347 123/184.21 |
| 6,959,678 | B2 | * | 11/2005 | Kino | B29C 65/568 123/184.53 |

(Continued)

FOREIGN PATENT DOCUMENTS

| | | |
|---|---|---|
| CN | 1940284 A | 4/2007 |
| CN | 205990977 | 3/2017 |

(Continued)

OTHER PUBLICATIONS

German Office Action, German Patent Office, Application No. 10 2018 121 658.0, dated Feb. 18, 2020 (with English translation).

(Continued)

*Primary Examiner* — Long T Tran
*Assistant Examiner* — James J Kim
(74) *Attorney, Agent, or Firm* — Greenblum & Bernstein, P.L.C.

(57) ABSTRACT

An intake system component for an internal combustion engine includes a tubular curved portion extending in a curved manner. The curved portion includes an inner wall located on an inner side of a curve relative to an inner passage. The inner wall is made of a breathable fibrous molded body. A part of the curved portion excluding the inner wall includes a portion having a lower breathability than the inner wall.

11 Claims, 5 Drawing Sheets

(56) References Cited

U.S. PATENT DOCUMENTS

| | | | |
|---|---|---|---|
| 8,132,552 B2* | 3/2012 | Matsumoto | F02M 35/1238 123/184.61 |
| 2001/0011448 A1* | 8/2001 | Kino | F02M 35/10347 55/385.3 |
| 2007/0068589 A1 | 3/2007 | Kino et al. | |
| 2009/0293832 A1* | 12/2009 | Matsumoto | F02M 35/1238 123/184.61 |
| 2011/0097571 A1* | 4/2011 | Tee | C08J 7/042 428/315.9 |
| 2014/0190764 A1* | 7/2014 | Matsumoto | F02M 35/1255 181/226 |
| 2016/0195049 A1 | 7/2016 | Zirkelbach | |
| 2016/0222927 A1 | 8/2016 | Kalauch | |

FOREIGN PATENT DOCUMENTS

| | | |
|---|---|---|
| DE | 102013016578 | 4/2015 |
| EP | 3030779 | 6/2018 |
| JP | 2015-055223 A | 3/2015 |
| JP | 2016-125379 | 7/2016 |

OTHER PUBLICATIONS

Chinese Office Action, Chinese Patent Office, Application No. 201811030150.1, dated May 27, 2020, with English translation.
Chinese Office Action, Chinese Patent Office, Application No. 201811030150.1, dated Nov. 17, 2020, English translation.
Japanese Office Action, Japanese Patent Office, Application No. 2017-172085, dated Jan. 5, 2021, English translation.

* cited by examiner

INTAKE SYSTEM COMPONENT FOR INTERNAL COMBUSTION ENGINE

BACKGROUND OF THE INVENTION

The present invention relates to an intake system component for an internal combustion engine.

The intake passage of an internal combustion engine includes an intake duct. Such intake ducts include, for example, an inlet duct made of a hard plastic (refer to, for example, Japanese Laid-Open Patent Publication No. 2016-125379).

Figure 5:
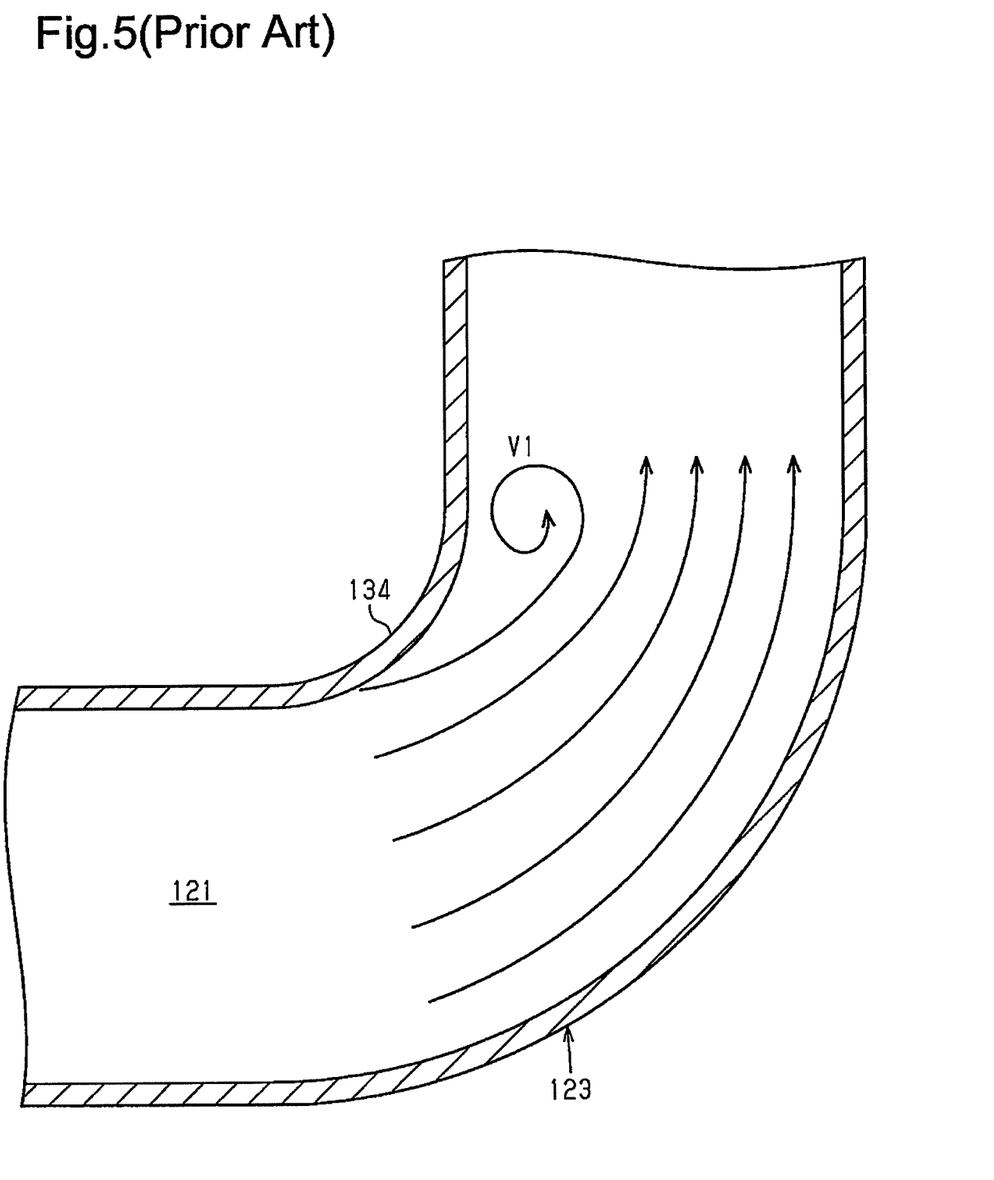
FIG. 5 is a cross-sectional view mainly showing a curved portion of a conventional intake duct.

In an intake duct including a tubular curved portion extending in a curved manner, the following problem occurs. A conventional intake duct shown in FIG. 5 includes a curved portion 123. The curved portion 123 includes an inner wall 134 located on the inner side of the curve relative to the inner passage 121. On the wall surface of the inner wall 134, air separation occurs to generate an eddy V1. This limits the airflow in the vicinity of the wall surface of the inner wall 134 and reduces the cross-sectional area of the flow passage of the main flow of the air in the curved portion 123. As a result, the pressure loss increases, and the airflow resistance increases.

Such a problem is not limited to the intake duct but occurs similarly in other intake system components having a tubular curved portion extending in a curved manner.

SUMMARY OF THE INVENTION

It is an object of the present invention to provide an intake system component for an internal combustion engine that reduces the airflow resistance.

An intake system component for an internal combustion engine that achieves the above object includes a tubular curved portion extending in a curved manner. The curved portion includes an inner wall located on an inner side of a curve relative to an inner passage. The inner wall is made of a breathable fibrous molded body. A part of the curved portion excluding the inner wall includes a portion having a lower breathability than the inner wall.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferable embodiments together with the accompanying drawings in which.

DETAILED DESCRIPTION OF THE PREFERABLE EMBODIMENTS

An inlet duct 10, which is an intake system component for an inner combustion engine according to one embodiment, will now be described with reference to FIGS. 1 to 3.

Figure 1:
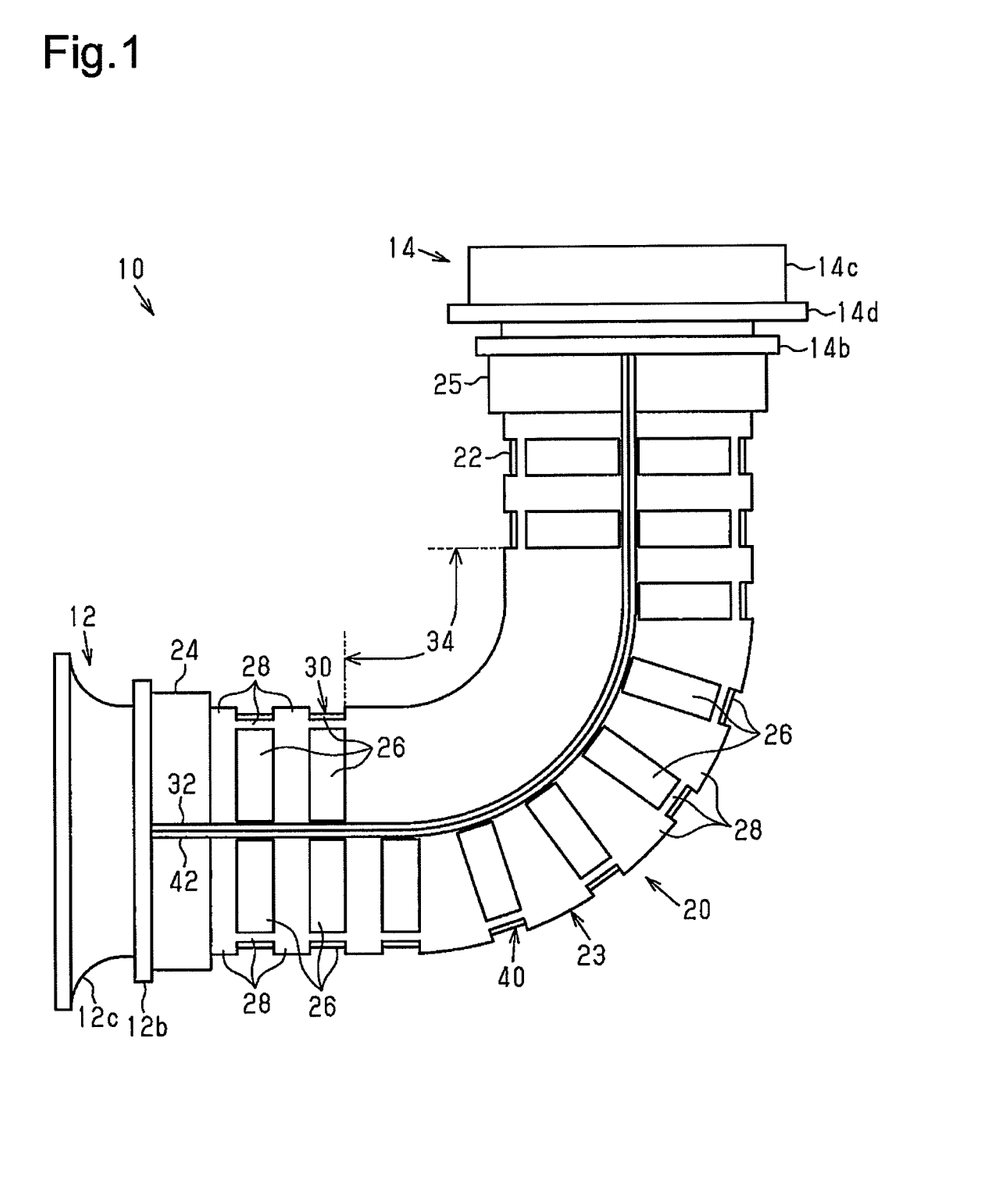
FIG. 1 is a side view showing an intake duct, which is an intake system component for an internal combustion engine according to one embodiment.
Figure 2:
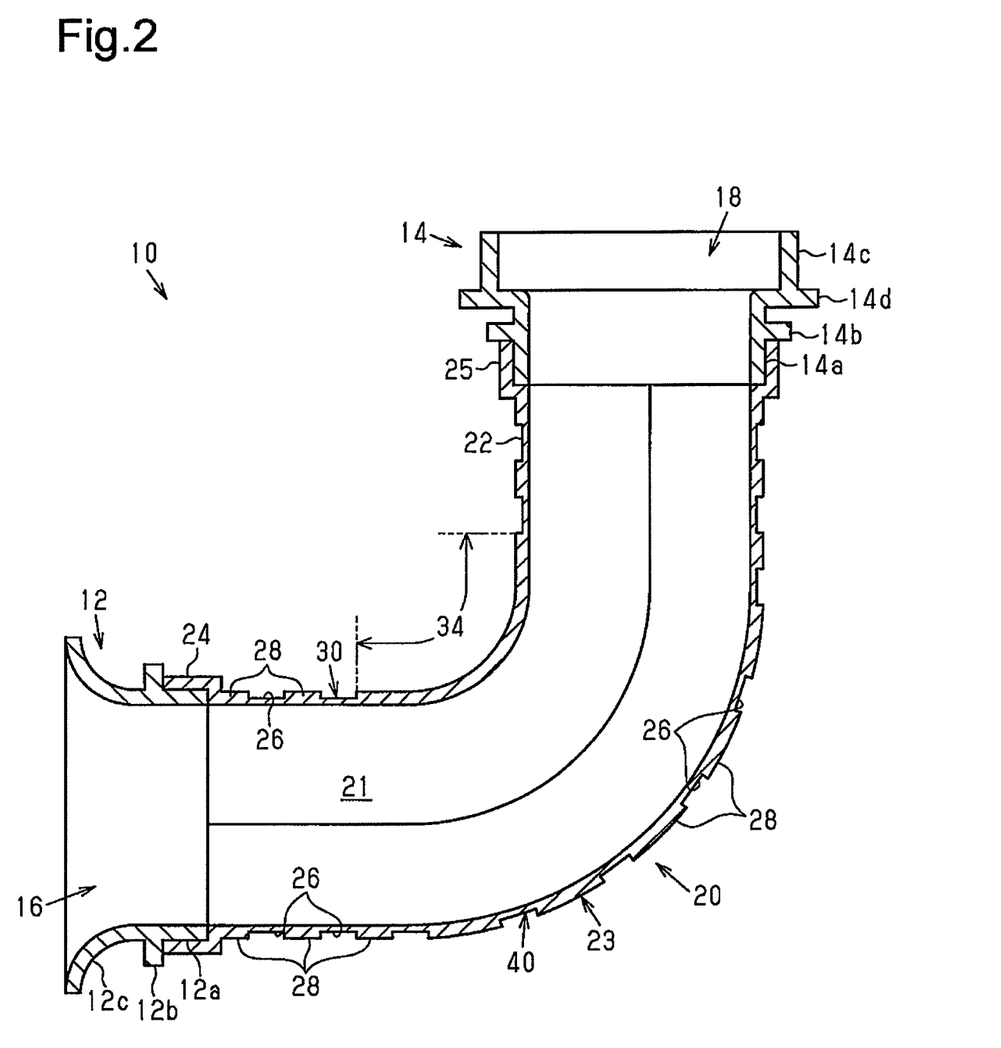
FIG. 2 is a cross-sectional view showing the intake duct of FIG. 1.

As shown in FIGS. 1 and 2, the inlet duct 10 includes a duct main body 20 made of a fibrous molded body, a tubular upstream connection member 12, and a tubular downstream connection member 14. The upstream connection member 12 and the downstream connection member 14 are both made of hard plastic.

In the following description, the upstream side and the downstream side of the direction intake air flows in the inlet duct 10 are simply referred to as the upstream side and the downstream side, respectively.

Upstream Connection Member 12

As shown in FIGS. 1 and 2, the upstream connection member 12 constitutes an inlet 16 of the inlet duct 10 and includes a tubular connection portion 12a, an annular flange 12b, and a funnel 12c. The flange 12b projects from the outer circumferential surface of the connection portion 12a. The funnel 12c is continuous with the upstream side of the connection portion 12a. Further, the funnel 12c is recurved radially outward toward the upstream side.

Downstream Connection Member 14

As shown in FIGS. 1 and 2, the downstream connection member 14 constitutes an outlet 18 of the inlet duct 10 and includes a tubular first connection portion 14a and an annular first flange 14b. The first flange 14b projects from the outer circumferential surface of the first connection portion 14a. Further, the downstream connection member 14 includes a tubular second connection portion 14c and an annular second flange 14d. The second connection portion 14c is continuous with the downstream side of the first connection portion 14a and has a larger inner diameter and a larger outer diameter than those of the first connection portion 14a. The second flange 14d projects from the outer circumferential surface of the second connection portion 14c. The second connection portion 14c is connected to the inlet (not shown) of an air cleaner.

Duct Main Body 20

As shown in FIGS. 1 and 2, the duct main body 20 is made of a tubular fibrous molded body and provided with a curved portion 23 extending in a curved manner.

The duct main body 20 includes two tubular halved bodies, namely, an inner halved body 30 and an outer halved body 40, each having the shape of a halved tube. The inner halved body 30 is a part of the duct main body 20 having a small radius of curvature, i.e., having a large curvature. The outer halved body 40 is a part of the duct main body 20 having a large radius of curvature, i.e., having a small curvature.

The inner halved body 30 includes two joints 32, which respectively project radially outward from the opposite ends of the inner halved body 30 in the circumferential direction. The two joints 32 are provided over the entire inner halved body 30 in the extending direction. The outer halved body 40 includes two joints 42, which respectively project radially outward from the opposite ends of the outer halved body 40 in the circumferential direction. The two joints 42 are provided over the entire outer halved body 40 in the extending direction of the outer halved body 40. The two joints 32 of the inner halved body 30 and the two joints 42 of the outer halved body 40 are joined to each other to form the duct main body 20.

The fibrous molded body of each of the halved bodies 30 and 40 is made of nonwoven fabric of known core-sheath composite fibers each including, for example, a core (not shown) made of polyethylene terephthalate (PET) and a sheath (not shown) made of denatured PET having a lower melting point than the PET fiber. The denatured PET functions as a binder that binds the PETs to each other.

It is preferable that the mixture percentage of denatured PET be 30 to 70%. In the present embodiment, the mixture percentage of denatured PET is 50%.

Such a composite fiber may include a core (not shown) made of polyethylene terephthalate (PET) and a sheath (not shown) made of polypropylene (PP) having a lower melting point than the PET fiber.

It is preferable that the mass per unit area of non-woven fabric be 500 to 1500 g/m². In the present embodiment, the mass per unit area of non-woven fabric is 800 g/m².

The halved bodies 30 and 40 are each formed by performing thermal compression molding on a nonwoven sheet having a thickness of, for example, 1 to 100 mm.

The duct main body 20 includes a main body portion 22, which has the curved portion 23, and ends 24 and 25, which are respectively located at the opposite ends of the main body portion 22.

The main body portion 22 includes multiple high-compression portions 26, which are spaced apart from one another, and multiple breathable low-compression portions 28, each located between the adjacent ones of the high-compression portions 26. The low-compression portions 28 are formed through thermal compression molding at a lower compressibility than that of the high-compression portions 26.

In the present embodiment, the high-compression portion 26 has a breathability of approximately 0 cm³/cm²·s. Further, it is preferable that the high-compression portion 26 have a thickness of 0.5 to 1.5 mm. In the present embodiment, the high-compression portion 26 has a thickness of 0.7 mm.

The low-compression portion 28 has a breathability of approximately 3 cm³/cm²·s. Further, it is preferable that the low-compression portion 28 have a thickness of 0.8 to 3.0 mm. In the present embodiment, the low-compression portion 28 has a thickness of 1.0 mm. In FIGS. 1 and 2, the thickness of the low-compression portion 28 is shown in an exaggerated manner.

The low-compression portions 28 include parts that extend over the entire main body portion 22 in the axial direction of the main body portion 22 and parts that extend in the circumferential direction of the main body portion 22.

As shown in FIG. 2, the high-compression portions 26 and the low-compression portions 28 are continuous with each other with steps located in between on the outer surface of the duct main body 20, and the high-compression portions 26 and the low-compression portions 28 are evenly continuous with each other on the inner surface of the duct main body 20.

In the present embodiment, the main body portion 22 of the outer halved body 40 includes multiple high-compression portions 26 and multiple low-compression portions 28. The part of the inner halved body 30 constituting the curved portion 23 and located on the inner side of the curve relative to the inner passage 21 is referred to as an inner wall 34. The entire inner wall 34 undergoes thermal compression molding at a compressibility equivalent to that of the low-compression portion 28.

The ends 24 and 25 each have a larger inner diameter and a larger outer diameter than those of the main body portion 22. The ends 24 and 25 and the joints 32 and 42 of the halved bodies 30 and 40 undergo thermal compression molding at a compressibility equivalent to that of the high-compression portion 26 of the main body portion 22.

With the connection portion 12a of the upstream connection member 12 inserted into the end 24 on the upstream side of the duct main body 20 and the flange 12b abutting against the end 24, the outer circumferential surface of the connection portion 12a is fixed to the inner circumferential surface of the end 24 using an adhesive.

With the first connection portion 14a of the downstream connection member 14 inserted into the end 25 on the downstream side of the duct main body 20 and the first flange 14b abutting against the end 25, the outer circumferential surface of the first connection portion 14a is fixed to the inner circumferential surface of the end 25 using an adhesive.

The operation of the present embodiment will now be described.

Figure 3:
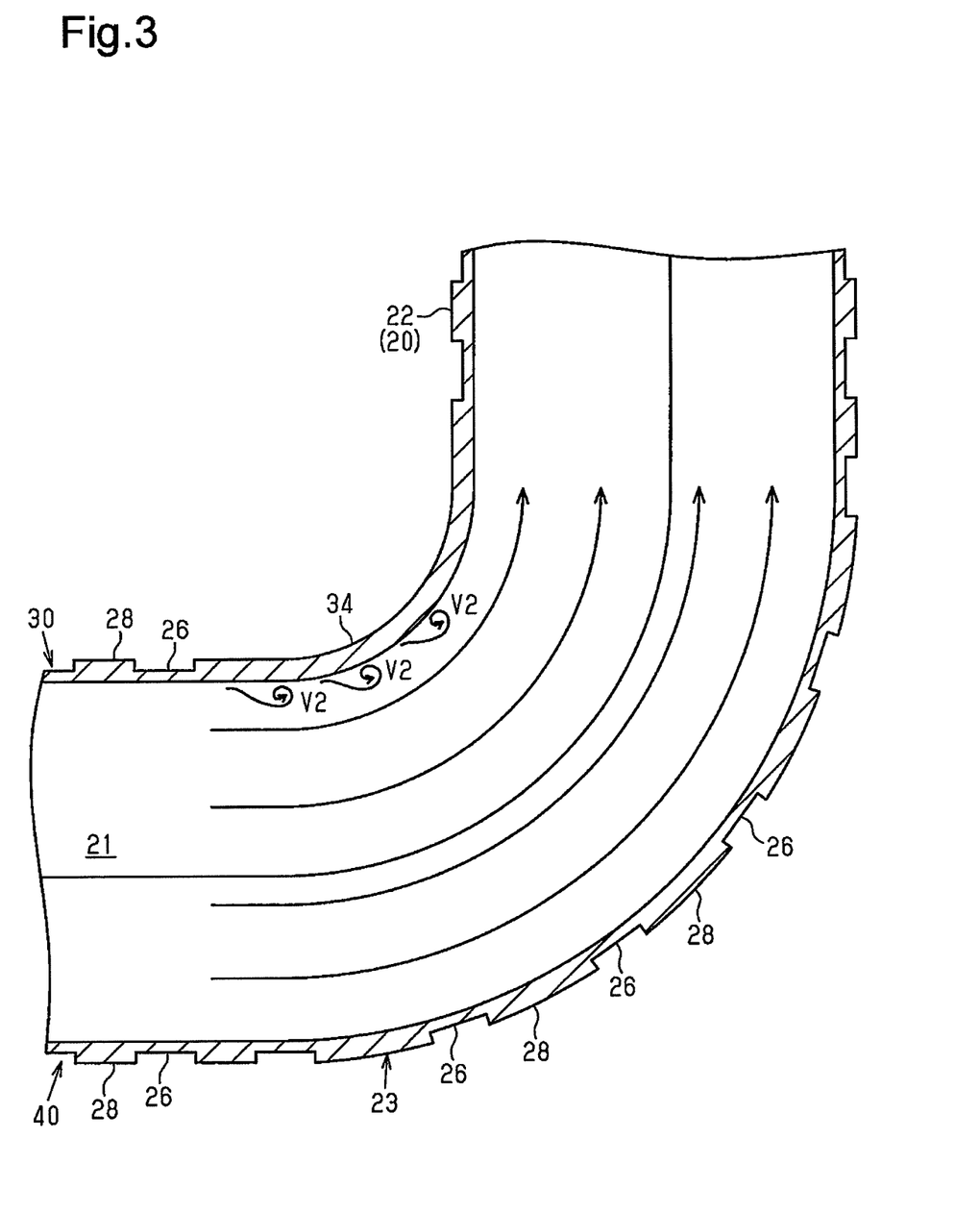
FIG. 3 is a cross-sectional view mainly showing a curved portion of the intake duct of FIG. 1.

As shown in FIG. 3, the inner wall 34 of the curved portion 23, where eddy currents are easily generated, is made of a breathable fibrous molded body and has a breathability equivalent to that of the low-compression portion 28. Thus, external air is suctioned through the inner wall 34 in a region upstream of the region where an eddy V1 is generated when using the conventional inner wall 134, which is made of, for example, a hard plastic and non-breathable (refer to FIG. 5). This forms a turbulent boundary layer in the vicinity of the wall surface of the inner wall 34 to generate eddies V2, which are smaller than the eddy V1, in the vicinity of the wall surface of the inner wall 34. In addition, kinetic energy is added to the air flowing in the vicinity of the wall surface of the inner wall 34. This reduces the difference in pressure between the upstream side and the downstream side of the air flowing in the vicinity of the wall surface of the inner wall 34. Thus, the generation of the large eddy V1 described above is limited. Accordingly, as the cross-sectional area of the flow passage of the main flow in the curved portion 23 increases, the pressure loss decreases.

The other part of the curved portion 23 excluding the inner wall 34, i.e., the outer halved body 40, includes multiple high-compression portions 26. That is, the outer halved body 40, which is the other part of the curved portion 23 excluding the inner wall 34, includes a part having a lower breathability than the inner wall 34. This hinders external air from being suctioned through the high-compression portions 26 and thus limits an increase in the thickness of the boundary layer in the vicinity of the wall surface of the outer halved body 40, i.e., a layer where the viscosity of air cannot be ignored.

The intake system component for the inner combustion engine according to the above embodiment has the following advantages.

(1) The duct main body 20 of the inlet duct 10 includes the tubular curved portion 23, which extends in a curved manner. The curved portion 23 includes the inner wall 34, which is located on the inner side of the curve relative to the inner passage 21. The inner wall 34 is made of a breathable fibrous molded body. The part of the curved portion 23 excluding the inner wall 34 includes the high-compression portions 26, which have a lower breathability than the inner wall 34.

Such a structure produces the above effects and thus reduces the airflow resistance.

(2) The inlet duct 10 includes the tubular duct main body 20, which is made of a fibrous molded body and includes the curved portion 23. The part of the curved portion 23 excluding the inner wall 34 includes the high-compression portions 26, which have a lower breathability than the inner wall 34, and the breathable low-compression portions 28, which are compression-molded at a lower compressibility than that of the high-compression portions 26.

In such a structure, since the duct main body 20 is made of a fibrous molded body, the duct main body 20 can be reduced in weight as compared to when the duct main body 20 is made of hard plastic.

Further, the above structure allows the noise pressure of the intake air to escape through a breathable part of the circumferential wall of the duct main body 20. This reduces the intake noise.

Additionally, in the above structure, the part of the curved portion 23 excluding the inner wall 34 includes the high-compression portions 26, which have a breathability of approximately 0 cm$^3$/cm$^2$·s, and the breathable low-compression portions 28. Thus, the proportion of the breathable portion in the part of the curved portion 23 excluding the inner wall 34 is smaller than that of the inner wall 34.

Thus, the above advantage (1) is obtained while reducing the duct main body 20 in weight.

(3) The duct main body 20 includes two halved bodies, i.e., the inner halved body 30 and the outer halved body 40. The inner wall 34 is provided on the inner halved body 30.

In such a structure, the duct main body 20 can be easily formed by joining the joints 32 and 42 of the halved bodies 30 and 40 to each other. Further, in the above structure, the inner wall 34 does not include a joint that joins two halved bodies. Thus, the entire inner wall 34 can be constituted by a breathable part. This allows external air to be suctioned through the entire inner wall 34. Accordingly, kinetic energy is added to the air flowing in the vicinity of the wall surface of the inner wall 34. This effectively reduces the airflow resistance.

(4) On the outer surface of the duct main body 20, the high-compression portions 26 are continuous with the inner wall 34 and the low-compression portions 28 with the steps located in between. On the inner surface of the duct main body 20, the high-compression portions 26 are evenly continuous with the inner wall 34 and the low-compression portions 28.

If steps are produced in the inner surface of the duct main body 20 with the formation of the high-compression portions 26 and the low-compression portions 28 on the inner surface of the duct main body 20, the airflow resistance of the intake air flowing in the vicinity of the inner surface of the duct main body 20 potentially increase.

In the above structure, since the high-compression portions 26 are evenly continuous with the low-compression portions 28 on the inner surface of the duct main body 20, the increase in the airflow resistance of the main flow of the intake air is avoided.

(5) The duct main body 20 includes the high-compression portions 26. Thus, the high-compression portions 26, which are harder than the low-compression portions 28, increase the strength of the duct main body 20.

Modifications

It should be apparent to those skilled in the art that the present invention may be embodied in many other specific forms without departing from the spirit or scope of the invention. Particularly, it should be understood that the present invention may be embodied in the following forms.

The split structure of the duct main body 20 is not limited to that described above as an example. For example, the inner wall may partially include a joint that joins two halved bodies. Further, the duct main body does not have to include two halved bodies. Instead, the duct main body may include three or more halved bodies.

Figure 4:
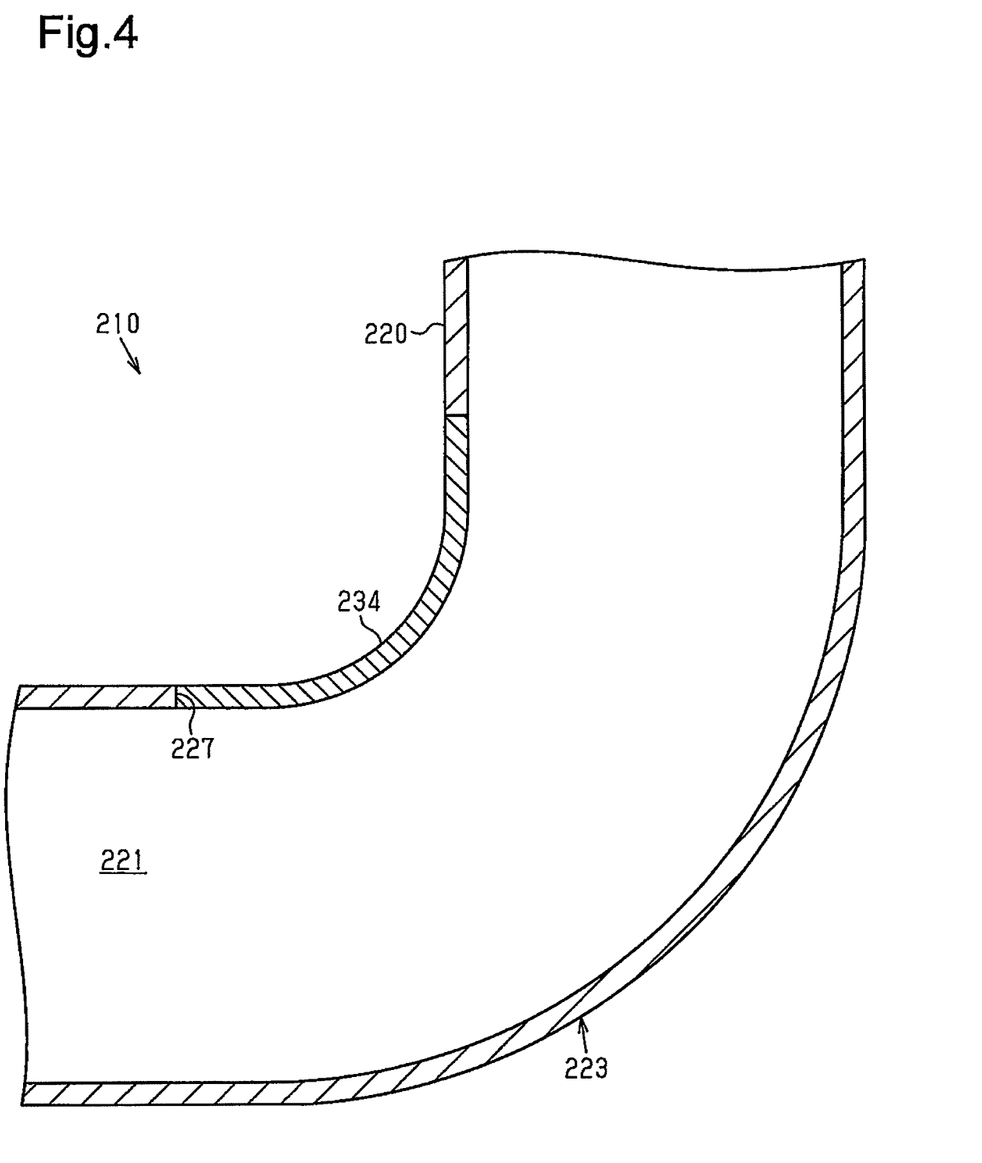
FIG. 4 is a cross-sectional view mainly showing a curved portion of an intake duct according to a modification.

The present invention is applicable to an intake duct including a tubular duct main body made of a plastic molded body and provided with a curved portion. Referring to FIG. 4, a duct main body 220 of an intake duct 210 is made of a hard plastic molded body. A through hole 227 extends through a part of the curved portion 223 located on the inner side of the curve relative to an inner passage 221. The through hole 227 is closed by an inner wall 234, which is made of a breathable fibrous molded body. In this case, the proportion of the breathable part of the curved portion 223 excluding the inner wall 234 is smaller than that of the inner wall 234. Thus, an advantage similar to advantage (1) of the above embodiment is obtained.

The subject to which the present invention is applied is not limited to the inlet duct. In short, the present invention simply needs to be applied to an intake system component including a tubular curved portion that extends in a curved manner and can be applied to other intake system components constituting an intake passage for an internal combustion engine.

Therefore, the present examples and embodiments are to be considered as illustrative and not restrictive and the invention is not to be limited to the details given herein, but may be modified within the scope and equivalence of the appended claims.

The invention claimed is:

1. An intake system component for an internal combustion engine, the intake system component comprising:
    a tubular curved portion extending in a curved manner, wherein
    the curved portion includes an inner wall located on an inner side of a curve relative to an inner passage, wherein the inner wall is made of a breathable fibrous molded body,
    a part of the curved portion excluding the inner wall includes a portion having a lower breathability than the inner wall, and
    a breathability of the inner wall permits air external to the curved portion to be suctioned through the inner wall to the inner passage to reduce an airflow resistance of an airflow through the inner passage.

2. The intake system component according to claim 1, wherein
    the intake system component is an intake duct including a tubular duct main body made of a fibrous molded body and provided with the curved portion, and
    the part of the curved portion excluding the inner wall includes a high-compression portion, which has a lower breathability than the inner wall, and a breathable low-compression portion, which is compression-molded at a lower compressibility than that of the high-compression portion.

3. The intake system component according to claim 2, wherein
    the duct main body includes two halved bodies, and
    the inner wall is provided on one of the two halved bodies.

4. The intake system component according to claim 1, wherein
    the intake system component is an intake duct including a tubular duct main body made of a plastic molded body and provided with the curved portion,
    a through hole extends through a part of the curved portion located on the inner side of the curve relative to the inner passage, and
    the through hole is closed by the inner wall that is a separate structure from the part of the curved portion through which the through hole extends.

5. The intake system component according to claim 2, wherein the high-compression portion and the low-compression portion are continuous with each other with a step located in between an outer surface of the duct main body, and
the high-compression portion and the low-compression portion are evenly continuous with each other on an inner surface of the duct main body.

6. The intake system component according to claim 1, wherein the breathability of the inner wall permits the air external to the curved portion to be suctioned through the inner wall to the inner passage to reduce a pressure difference between an upstream side and a downstream side of air flowing in a vicinity of an inner surface of the inner wall.

7. The intake system component according to claim 1, wherein the breathability of the inner wall permits the air external to the curved portion to be suctioned through the inner wall to the inner passage to form a turbulent boundary layer in a vicinity of an inner surface of the inner wall.

8. The intake system component according to claim 1, wherein the breathability of the inner wall permits the air external to the curved portion to be suctioned through the inner wall to the inner passage to reduce a size of generated eddies in a vicinity of an inner surface of the inner wall.

9. The intake system component according to claim 1, wherein the inner passage is an innermost passage of the curved portion through which the airflow is configured to flow.

10. An intake system component for an internal combustion engine, the intake system component comprising:
a tube that includes two tubular straight portions and a tubular curved portion, the tubular curved portion extending between the two tubular straight portions in a curved manner so as to follow a curved segment of a central axis of an inner passage of the tube, wherein
the tubular curved portion includes an inner wall located on an inner side of the tubular curved portion relative to the central axis of the inner passage of the tube, wherein the inner wall is made of a breathable fibrous molded body,
a part of the tubular curved portion excluding the inner wall includes a portion having a lower breathability than the inner wall,
the inner wall extends continuously from at least a first end of the tubular curved portion that is connected to an end of one of the two tubular straight portions to at least a second end of the tubular curved portion that is connected to an end of another one of the two tubular straight portions, and
a breathability of the inner wall permits air external to the tubular curved portion to be suctioned through the inner wall to the inner passage to reduce an airflow resistance of an airflow through the inner passage.

11. An intake system component for an internal combustion engine, the intake system component comprising:
a tubular curved portion extending in a curved manner, wherein
the curved portion includes an inner wall located on an inner side of a curve relative to an inner passage, wherein the inner wall is made of a breathable fibrous molded body,
a part of the curved portion excluding the inner wall includes a portion having a lower breathability than the inner wall, and
a breathability of the inner wall permits air external to the curved portion to be suctioned through the inner wall to the inner passage to reduce a pressure difference between an upstream side and a downstream side of air flowing in a vicinity of an inner surface of the inner wall.

* * * * *